United States Patent
Huang et al.

(10) Patent No.: US 9,623,635 B2
(45) Date of Patent: Apr. 18, 2017

(54) CHIP THROUGH FLOORING MATERIAL USING PLA RESIN

(75) Inventors: Cheng-Zhe Huang, Cheongju-si (KR); Ji-Young Kim, Ulsan (KR); Ki-Bong Park, Seoul (KR); Chang-Won Kang, Cheongju-si (KR); Jun-Hyuk Kwon, Gunpo-si (KR); Hyun-Jong Kwon, Ulsan (KR); Sang-Sun Park, Cheongju-si (KR); Jang-Ki Kim, Cheongju-si (KR); Gyeong-Min Lee, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 1027 days.

(21) Appl. No.: 13/510,049

(22) PCT Filed: Mar. 7, 2011

(86) PCT No.: PCT/KR2011/001559
§ 371 (c)(1),
(2), (4) Date: May 16, 2012

(87) PCT Pub. No.: WO2011/115382
PCT Pub. Date: Sep. 22, 2011

(65) Prior Publication Data
US 2012/0231256 A1    Sep. 13, 2012

(30) Foreign Application Priority Data
Mar. 15, 2010   (KR) .................. 10-2010-0023052

(51) Int. Cl.
*B32B 27/36*     (2006.01)
*B32B 5/16*      (2006.01)
(Continued)

(52) U.S. Cl.
CPC .............. *B32B 21/02* (2013.01); *B32B 21/08* (2013.01); *B32B 27/308* (2013.01); *B32B 27/40* (2013.01);
(Continued)

(58) Field of Classification Search
USPC ...................... 428/220, 481, 326, 425.1, 334
See application file for complete search history.

(56) References Cited

U.S. PATENT DOCUMENTS 4,902,367 A   2/1990   Park et al.
6,869,985 B2  3/2005   Mohanty et al.
(Continued)

FOREIGN PATENT DOCUMENTS

JP   09151594 A    6/1997
JP   116278 A      1/1999
(Continued)

OTHER PUBLICATIONS

Machine english_Translation_KR_1020080064392_A; Chip Inlaid Flooring Tile in Which Interior Pattern of Chip Layer and Surface EMBO Are Harmonious; Jul. 9, 2008; Korea Patent Office; whole document.*

(Continued)

*Primary Examiner* — Tahseen N Khan
(74) *Attorney, Agent, or Firm* — Hauptman Ham, LLP

(57) ABSTRACT

Disclosed is a chip through flooring material using a PLA resin, which is environmentally friendly by using the PLA resin and can realize the texture of natural wood and the unique fragrance of trees. According to the present invention, the chip through flooring material using the PLA resin includes: a chip through layer; and a surface treatment layer which is formed on a surface of the chip through layer, wherein the chip through layer includes the PLA resin.

12 Claims, 1 Drawing Sheet

(51) Int. Cl.

| | | |
|---|---|---|
| *B32B 27/06* | (2006.01) | |
| *B32B 21/02* | (2006.01) | |
| *B32B 21/08* | (2006.01) | |
| *B32B 27/30* | (2006.01) | |
| *B32B 27/40* | (2006.01) | |
| *E04F 15/10* | (2006.01) | |

(52) U.S. Cl.
CPC ... *B32B 2260/026* (2013.01); *B32B 2260/046* (2013.01); *B32B 2307/584* (2013.01); *B32B 2471/00* (2013.01); *E04F 15/102* (2013.01); *Y10T 428/253* (2015.01); *Y10T 428/263* (2015.01); *Y10T 428/3179* (2015.04); *Y10T 428/31591* (2015.04)

(56) References Cited

U.S. PATENT DOCUMENTS

| | | |
|---|---|---|
| 7,256,223 B2 | 8/2007 | Mohanty et al. |
| 7,354,656 B2 | 4/2008 | Mohanty et al. |
| 2002/0150775 A1 | 10/2002 | Ishikawa |
| 2005/0136259 A1* | 6/2005 | Mohanty et al. ............ 428/409 |
| 2006/0032175 A1* | 2/2006 | Chen et al. .................... 52/578 |
| 2006/0142505 A1 | 6/2006 | Umemoto et al. |
| 2008/0081158 A1* | 4/2008 | Winey .................... E04F 15/16 428/195.1 |
| 2009/0264560 A1* | 10/2009 | Warnes .................... B27N 1/00 524/13 |
| 2009/0270524 A1 | 10/2009 | Oka et al. |
| 2009/0311510 A1 | 12/2009 | Ogawa et al. |
| 2010/0015420 A1* | 1/2010 | Riebel .................... B32B 27/06 428/203 |

FOREIGN PATENT DOCUMENTS

| | | |
|---|---|---|
| JP | 2004018592 A | 1/2004 |
| JP | 2004196967 A | 7/2004 |
| JP | 2005002174 A1 * | 1/2005 |
| JP | 2005060689 A | 3/2005 |
| JP | 2005232828 A | 9/2005 |
| JP | 2006118120 A | 5/2006 |
| JP | 2008056745 A | 3/2008 |
| JP | 2008062428 A | 3/2008 |
| JP | 2008075367 A | 4/2008 |
| JP | 2008-248050 | 10/2008 |
| JP | 2009501096 A | 1/2009 |
| JP | 2009235365 A1 * | 10/2009 |
| JP | 2010006041 A | 1/2010 |
| JP | 2010053315 A | 3/2010 |
| KR | 10-2008-0043041 | 5/2008 |
| KR | 1020080064392 A * | 7/2008 |
| KR | 20080092588 A | 10/2008 |
| KR | 10-2009-0084372 | 8/2009 |
| WO | 2009120311 A2 | 10/2009 |

OTHER PUBLICATIONS

Machine_English_Translation_JP_2005002174_A; Kumazawa, Sadanori; Resin Composition and Molded Article Made of the SAme; Jan. 6, 2005; JPO; whole document.*
Machine English Translation_JP_2009235365A1; Iizaka, Hirofumi; Polylactic Acid Composite Molding; Oct. 15, 2009; JPO; whole document.*
European extended search report dated Apr. 24, 2014.
Japanese Office Action dated Sep. 16, 2014.
Japanese Office Action dated Dec. 3, 2013.
Chinese Office Action dated Dec. 10, 2013.
International Search Report mailed Nov. 30, 2011 for PCT/KR2011/001559.

* cited by examiner

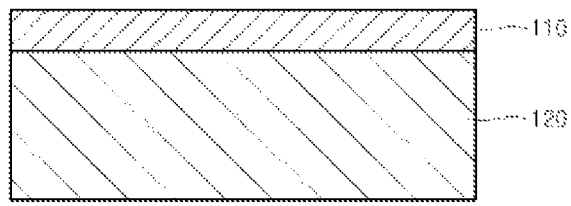

CHIP THROUGH FLOORING MATERIAL USING PLA RESIN

CROSS REFERENCE TO RELATED APPLICATION

This application claims the priority of Korean Patent Application No. 10-2010-0023052, filed on Mar. 15, 2010 in the KIPO (Korean Intellectual Property Office). Further, this application is the National Phase application of International Application No. PCT/KR2011/001559 filed Mar. 7, 2011, which designates the United States and was published in Korean.

TECHNICAL FIELD

The present invention relates to a chip through flooring material, and more particularly, to a chip through flooring material using a polylactic acid (PLA) resin, which includes a chip through layer composed of the PLA resin and wood flour, thereby realizing environmental friendliness and the texture of natural wood.

BACKGROUND ART

Flooring materials used for buildings, such as houses, apartments, offices, and stores, generally include petroleum resins such as polyvinyl chloride (PVC).

Flooring materials containing PVC are manufactured by extrusion or calendering of PVC resins. However, since PVC resins are derived from petroleum, a difficulty may occur in terms of supply of raw materials in the future due to the exhaustion of petroleum resources.

Further, PVC flooring materials generate a large amount of toxic substances in use or when discarded and thus need to be used less in view of environmental considerations.

Recently, green flooring materials based on environmentally friendly resins have received attention.

However, typical green flooring materials have low strength and are not suited to molding or processing. Moreover, such materials are likely to form a gap due to heat in use.

DISCLOSURE

Technical Problem

The present invention is directed to providing a chip through flooring material, which uses a PLA resin to realize environmental friendliness.

In addition, the present invention is directed to providing a chip through flooring material, which uses a PLA resin to realize the texture of natural wood and the unique fragrance of trees.

Technical Solution

In accordance with one aspect of the present invention, a chip through flooring material using a PLA resin includes a chip through layer; and a surface treatment layer formed on a surface of the chip through layer, wherein the chip through layer includes the PLA resin.

Advantageous Effects

According to the present invention, the chip through flooring material includes a chip through layer, which is composed of a PLA resin based on plant resources and natural wood flour, thereby realizing environmental friendliness.

Further, according to the present invention, the chip through flooring material using a PLA resin includes a chip through layer, which contains wood flour and pine resin to exhibit the texture of natural wood and the unique fragrance of trees.

DESCRIPTION OF DRAWING

FIG. 1 is a side-sectional view of a chip through flooring material using a PLA resin according to one embodiment of the present invention.

MODE FOR INVENTION

The above and other aspects, features, and advantages of the invention will become apparent from the detailed description of the following embodiments in conjunction with the accompanying drawing. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

Now, embodiments of the invention will be described in more detail with reference to the accompanying drawing.

FIG. 1 is a side-sectional view of a chip through flooring material using a PLA resin according to one embodiment of the present invention.

The flooring material according to the present invention is a chip through type and may be defined as a flooring material having a surface structure and pattern of a chip through layer throughout the flooring material. The chip through layer may be composed of a single layer or two to five sheets stacked one above another, followed by thermal compression.

The chip through layer may be formed in various ways described hereinafter.

First, the chip through layer 120 may include wood chips having a marble, single-colored or multicolored appearance to provide the appearance, texture and unique fragrance of wood. Such wood chips may be prepared by drying and pulverizing plant materials and may be composed of wood flour, which may be used alone or in combination with chaff and bamboo chips. Further, the wood chips may be selectively or entirely dyed.

The wood chips may have a particle size ranging from 10 to 120 mesh. If the wood chips have a particle size less than 10 mesh, the appearance and characteristics of the flooring material can be deteriorated, and if the wood chips have a particle size above 120 mesh, the manufacturing costs for the wood chips can be excessively increased.

In addition, the wood chips may be present in an amount of 200 parts by weight or less based on 100 parts by weight of the PLA resin. If the amount of the wood chips exceeds 200 parts by weight based on 100 parts by weight of the PLA resin, the flooring material has low realism in appearance and texture of natural trees, and has low strength, causing deterioration in formability.

The chip through layer including the wood chips may be formed by, for example, calendering a mixture of the wood chips and the PLA resin.

Further, the chip through layer 120 may be formed by pulverizing a PLA resin-containing sheet to prepare single-colored or multi-colored PLA chips, followed by arrangement and rolling of the PLA chips. Here, the sheet comprising the PLA resin may further include wood flour, chaff, pine resin, additives, pigments, and the like. At this time, the wood flour or chaff may be present in an amount of 200 parts by weight or less based on 100 parts by weight of the PLA resin in consideration of formability.

Referring to FIG. 1, the chip through flooring material according to the embodiment includes a surface treatment layer 110 and a chip through layer 120 from an upper side thereof.

In this embodiment, the chip through layer 120 includes a polylactic acid (PLA) resin.

The PLA resin is a thermoplastic polyester of lactide or lactic acid, which can be prepared by polymerization of lactic acid obtained by fermentation of starch extracted from renewable plant resources, such as corn and potato. The PLA resin is an environmentally friendly material in that it discharges remarkably less toxic substances to the environment, for example, $CO_2$, in use or when discarded than petroleum-based materials, for example, polyvinyl chloride (PVC), and is readily biodegraded when discarded.

The PLA resin may be generally classified into a crystalline PLA (c-PLA) resin and an amorphous PLA (a-PLA) resin. Since the crystalline PLA resin can cause bleeding of a plasticizer towards a sheet surface, the amorphous PLA resin may be used. The amorphous PLA resin provides an advantage of eliminating use of compatibilizing agents, which are added to prevent bleeding of the plasticizer. When using the amorphous PLA resin, a 100% amorphous PLA resin may be used as the PLA resin. As needed, a PLA resin exhibiting both crystalline and amorphous properties may be used.

For the chip through layer 120, the PLA resin may further include a non-phthalate plasticizer, an acrylic copolymer as a melt strength enhancer, a lubricant, a chain extender, an anti-hydrolysis agent, and the like.

The non-phthalate plasticizer softens the PLA resin to improve thermoplasticity, facilitating molding at high temperature. In one embodiment, acetyl tributyl citrate (ATBC) may be used as the non-phthalate plasticizer.

The non-phthalate plasticizer may be present in an amount of 5 to 100 parts by weight based on 100 parts by weight of the PLA resin. If the non-phthalate plasticizer is added in an amount less than 5 parts by weight based on 100 parts by weight of the PLA resin, hardness of the PLA resin can increase, reducing processability. If the non-phthalate plasticizer is added in an amount exceeding 100 parts by weight based on 100 parts by weight of the PLA resin, compatibility with other components in the chip through layer 120 decreases, thereby deteriorating physical properties including processability.

The melt strength enhancer serves to reinforce the PLA resin having poor intrinsic melt strength and heat resistance to secure processability upon melt extrusion.

As the melt strength enhancer, an acrylic copolymer may be used in consideration of good compatibility with the PLA resin, high strength and heat resistance. Particularly, test results show that the acrylic copolymer may be useful for calendaring and pressing of the PLA.

As the melt strength enhancer, the acrylic copolymer may be present in an amount of 0.1 to 20 parts by weight based on 100 parts by weight of the PLA resin. If the amount of the acrylic copolymer is less than 0.1 parts by weight, the melt efficiency and melt strength of the PLA resin cannot be sufficiently improved. If the amount of the acrylic copolymer exceeds 20 parts by weight, manufacturing costs of the chip through layer 120 can be increased and overall physical properties of the chip through layer 120 can be deteriorated due to inappropriate compatibility with other components forming the chip through layer 120.

The acrylic copolymer may have, without being particularly limited to, a weight average molecular weight (Mw) of 800,000 to 6,000,000 in view of improvement in melt strength during processing and compatibility with other components.

The lubricant may be added to the PLA resin to prevent the resin from adhering to a calendar roll or press roll during processes of forming the chip through layer 120, such as calendaring, pressing and the like.

Although there are various kinds of lubricants, environmentally friendly lubricants, such as higher fatty acids, may be adopted in some embodiments of the invention, specifically, a saturated fatty acid with an 18 carbon chain, such as stearic acid, may be used.

The lubricant may be present in an amount of 0.01 to 10 parts by weight based on 100 parts by weight of the PLA resin. If the amount of the lubricant is less than 0.01 parts by weight based on 100 parts by weight of the PLA resin, the lubricant does not function effectively. If the amount of the lubricant exceeds 10 parts by weight based on 100 parts by weight of the PLA resin, the PLA resin can be deteriorated in terms of impact resistance, heat resistance, and gloss.

The chain extender serves to improve tensile strength, heat resistance and the like of the chip through layer 120 by increasing molecular weight through chain extension.

Examples of the chain extender may include diisocyanate, epoxy group copolymers, and hydroxycarboxylic compounds, without being limited thereto.

The chain extender may be present in an amount of 0.01 to 10 parts by weight based on 100 parts by weight of the PLA resin. If the amount of the chain extender is less than 0.01 parts by weight based on 100 parts by weight of the PLA resin, the chain extender does not function effectively, and if the amount of the chain extender exceeds 10 parts by weight based on 100 parts by weight of the PLA resin, gloss of the PLA resin can be deteriorated.

Further, in order to prevent deterioration in mechanical properties of the PLA resin including impact resistance through hydrolysis, the chip through layer 120 may further include an anti-hydrolysis agent in the PLA resin. Any typical anti-hydrolysis agent including carbodiimide or oxazoline may used.

The anti-hydrolysis agent may be present in an amount of 10 parts by weight or less based on 100 parts by weight of the PLA resin. If the amount of the anti-hydrolysis agent exceeds 10 parts by weight based on 100 parts by weight of the PLA resin, molding processibility can be deteriorated and manufacturing costs can significantly increase since the anti-hydrolysis agent is expensive.

Further, the chip through layer 120 may further include calcium carbide ($CaCO_3$) as reinforcing inorganic fillers, or titanium dioxide ($TiO_2$) or pine resin as white pigments for aesthetic purposes.

Calcium carbide may be present in an amount of 1,000 parts by weight or less based on 100 parts by weight of the PLA resin. Further, titanium dioxide may be present in an amount of 50 parts by weight or less based on 100 parts by weight of the PLA resin. The pine resin may be present in an amount of 20 parts by weight or less based on 100 parts by weight of the PLA resin. If the amounts of calcium carbide, titanium dioxide and pine resin exceed these ranges, there can be deterioration in processibility due to reduction in coupling force between components.

The chip through layer 120 may have a thickness ranging from 1.0 to 5.0 mm. If the thickness of the chip through layer 120 is less than 1.0 mm, the chip through layer has low strength and thus contains a small amount of wood flour or pine resin, thereby making it difficult to realize the texture of natural woods. If the thickness of the chip through layer 120 exceeds 5.0 mm, the overall manufacturing cost of the flooring material increases.

The surface treatment layer 110 is formed on the chip through layer 120 to improve surface qualities of the chip through layer 120, including scratch resistance and abrasion resistance while enhancing contamination resistance in order to facilitate cleaning.

The surface treatment layer 110 may be formed of polyurethane, urethane acrylate, or wax, which is generally used for surface treatment layers of flooring materials. The surface treatment layer 110 may be formed in various ways. For example, when urethane acrylate is used, a urethane acrylate UV-curable composition may be applied to an upper side of the chip through layer 120 and cured through UV curing, thereby forming the surface treatment layer. Alternatively, a thermosetting wax may be applied to the upper side of the chip through layer 120, followed by drying in a hot air oven, thereby forming the surface treatment layer.

The surface treatment layer 110 may have a thickness ranging from 0.01 to 0.1 mm. If the thickness of the surface treatment layer 110 is less than 0.01 mm, it is difficult to improve physical properties including scratch resistance, and if the thickness of the surface treatment layer 110 exceeds 0.1 mm, surface treatment requires excessive costs and the flooring material can be deteriorated in terms of appearance qualities.

According to the present invention, there is no particular restriction as to a method of manufacturing the chip through layer including a PLA resin through calendering or the like. For example, when the wood chips are used, the method may include mixing and kneading the wood chips with other components, calendering the kneaded mixture to form a desired sheet shape, stacking 1 to 5 sheets, and thermal compression of the stack, thereby forming a chip through layer.

Here, mixing and kneading the components may be carried out, for example, on liquid or powdery raw materials using a super mixer, extruder, kneader, or 2 or 3-roll. Further, mixing and kneading may be repeatedly performed in multiple stages so as to efficiently mix the components such that the mixed components are kneaded at about 120 to 200° C. using a Banbury mixer, and the kneaded components are subjected to primary mixing and secondary mixing at about 120 to 200° C. using a t-roll.

Also, there is no particular restriction as to a method of manufacturing a sheet-shaped base layer, which involves subjecting the mixed components to calendaring. For example, the base layer may be formed using a general device, e.g., an inverted "L" four-roll calender.

Calendering conditions may be suitably adjusted in consideration of compositions of used resin compositions. For example, calendering may be carried out at a temperature ranging from about 120 to about 200° C.

As described above, in the chip through flooring material according to the present invention, the chip through layer is formed using a PLA resin based on plant resources and an environmentally friendly plasticizer such as ATBC, thereby realizing environmental friendliness.

In addition, the chip through flooring material according to the present invention includes wood flour and pine resin in the chip through layer thereof, thereby realizing the texture of natural wood and the unique fragrance of trees.

Although some exemplary embodiments of the present invention have been described with reference to the accompanying drawing, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined by the accompanying claims.

The invention claimed is:

1. A chip through flooring material using a PLA-resin, comprising:
    a chip through layer comprising:
        PLA chips arranged and rolled into a layer, wherein the PLA chips are formed by pulverizing a PLA-containing sheet, wherein the PLA-containing sheet comprises:
        a PLA resin;
        wood chips, wherein the wood chips are at least one selected from the group consisting of wood flour, chaff and bamboo chips, and are present in an amount of 200 parts by weight or less based on 100 parts by weight of the PLA resin;
        a pine resin, wherein the pine resin is presented in an amount of 20 parts by weight or less and more than 0 parts by weight based on 100 parts by weight of the PLA resin; and
        at least one component selected from the group consisting of 5 to 100 parts by weight of a non-phthalate plasticizer, 0.1 to 20 parts by weight of an acrylic copolymer, 0.01 to 10 parts by weight of a lubricant, 0.01 to 10 parts by weight of a chain extender, and 10 parts by weight or less of an anti-hydrolysis agent based on 100 parts by weight of the PLA resin; and
        at least one component selected from the group consisting of 1,000 parts by weight or less of calcium carbide ($CaCO_3$), and 50 parts by weight or less of titanium dioxide ($TiO_2$); and
    a surface treatment layer on a surface of the chip through layer.

2. The chip through flooring material of claim 1, wherein the wood chips have a particle size ranging from 10 to 120 mesh.

3. The chip through flooring material of claim 1, wherein the chip through flooring material comprises the non-phthalate plasticizer, and the non-phthalate plasticizer is acetyl tributyl citrate (ATBC).

4. The chip through flooring material of claim 1, wherein the chip through layer has a thickness of 1.0 to 5.0 mm.

5. The chip through flooring material of claim 1, wherein the surface treatment layer comprises at least one of polyurethane, urethane acrylate or wax.

6. The chip through flooring material of claim 1, wherein the surface treatment layer has a thickness of 0.01 to 0.1 mm.

7. The chip through flooring material of claim 1, wherein the chip through flooring material comprises the chain extender, and the chain extender is at least one selected from the group consisting of a diisocyanate, an epoxy group copolymer, and a hydroxycarboxylic compound.

8. The chip through flooring material of claim 1, wherein the chip through layer comprises the anti-hydrolysis agent, and wherein the anti-hydrolysis agent is at least one selected from the group consisting of carbodiimide and oxazoline.

9. The chip through flooring material of claim 1, wherein the PLA-containing sheet is formed by:
   mixing and kneading of the PLA resin, the wood chips, and the at least one component selected from the group consisting of the plasticizer, the acrylic copolymer, the lubricant, the chain extender and the anti-hydrolysis agent to form a mixture, and
   calendaring the mixture to form the PLA sheet.

10. The chip through flooring material of claim 1, wherein the PLA resin is an amorphous PLA resin.

11. The chip through flooring material of claim 10, wherein the amorphous PLA resin is 100% amorphous PLA resin.

12. The chip through flooring material of claim 10, wherein the amorphous PLA resin is a PLA resin exhibiting both crystalline and amorphous properties.

* * * * *